March 28, 1939.       R. H. BEACH       2,151,888
ELECTRIC IRON
Filed May 27, 1937
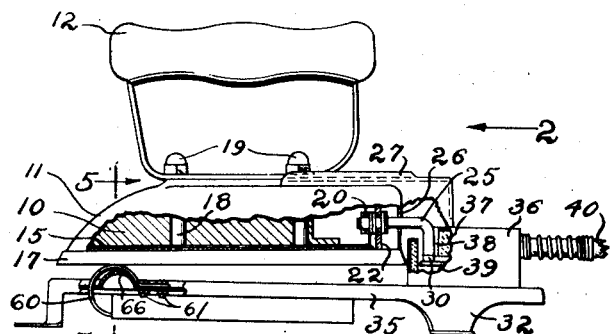
Fig. 1
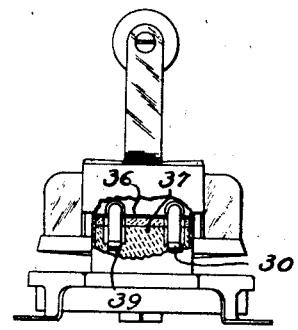
Fig. 2
Fig. 3
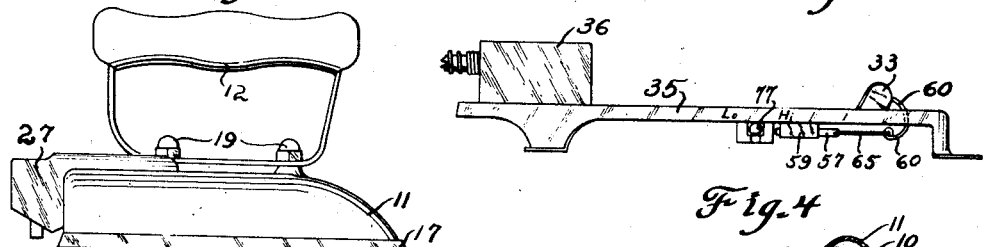
Fig. 4
Fig. 5
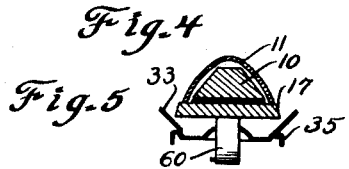
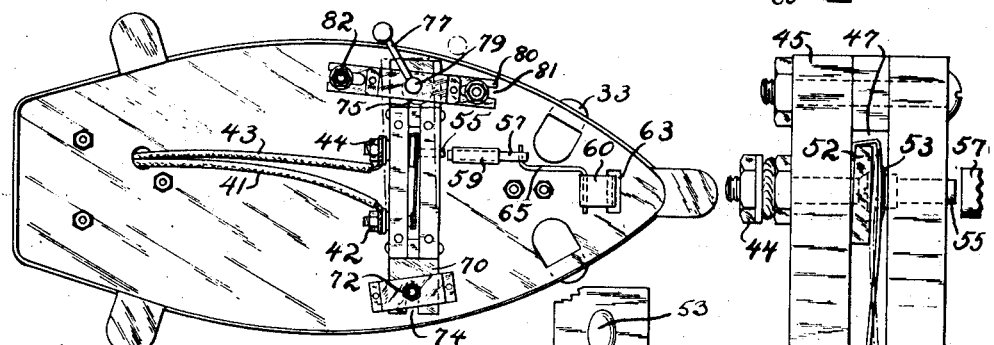
Fig. 6      Fig. 8   Fig. 7
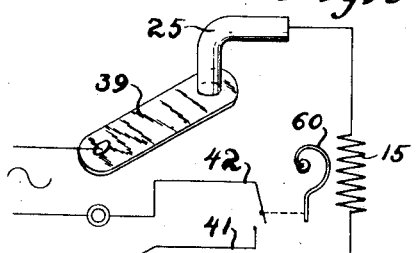
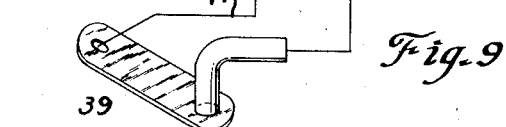
Fig. 9
INVENTOR.
Ralph H. Beach
BY
ATTORNEYS.

Patented Mar. 28, 1939

2,151,888

UNITED STATES PATENT OFFICE 2,151,888

ELECTRIC IRON

Ralph H. Beach, Plymouth, Mich.

Application May 27, 1935, Serial No. 23,616

12 Claims. (Cl. 219—25)

This invention relates to electrically heated pressing irons, and has for a particular object the provision of an improved and fully automatic cordless iron, provided with heat controlling means enabling maintenance of the iron at any desired temperature, yet which utilizes no wires extending to the iron itself.

Many previous attempts have been made to produce a satisfactory iron of the so-called "cordless" variety, incorporating a heating element which is energized only while the iron rests upon a stand or the like. Many difficulties have prevented the previous development of a satisfactory iron of this type. If it is to develop and maintain sufficient heat despite the relatively short periods during which it may be on the stand when in intensive service, the heating element must be of heavy capacity—and proportionately heavy current drain, in order to insure quick heating. This virtually necessitates the incorporation of an automatic cut-out, preferably thermostatic, but it was found that with the powerful heating elements required, the thermostatic means could not be made to break the heavy current satisfactorily, and live under the high temperatures developed, the snap action or equivalent means also being soon destroyed by the heat, if not by arcing under the load.

It has also not been possible to provide such thermostatic switches with simple and inexpensive adjusting means of such character as to allow accurate maintenance of temperatures within desired limits and infinite adjustability in a quick and easy manner at the temperature to which the iron is held. Such an adjusting means constitutes an important aim of the present invention, and the overcoming of the other obstacles above mentioned constitutes, in brief, a summation of its principal objects.

Another particular object is the arrangement of both a thermostat and a quick-action switch in such manner that they are not exposed to and cannot be harmfully affected by the high heat developed within the iron, and permanently retain their accuracy and effectiveness, as well as the construction of the switch itself in an improved and very simple manner which affords very quick and positive breaking.

A still further object is to provide improved combined supporting and thermostatic controlling means for a cordless electric iron, so arranged that such means is directly subjected to heat developed by and temperature changes of the iron, yet is itself effectively cooled and cannot rise to unnecessarily high or dangerous temperatures, and is directly connected to and arranged to operate switching means of snap-acting character so disposed as to be virtually insulated from and unaffected by the heat of the iron.

Other objects and advantages will be apparent from the following description wherein reference is made to the accompanying drawing illustrating a preferred embodiment of my invention and wherein similar reference numerals designate similar parts throughout the several views.

In the drawing:

Figure 1 is a side elevational view, partly broken away, of a pressing iron and supporting stand assembly incorporating the principles of this invention.

Figure 2 is a rear elevational view thereof, also partly broken away.

Figure 3 is an elevational view of the iron alone, taken looking at the side opposite to that shown in Figure 1.

Figure 4 is an elevational view of the opposite side of the stand from that shown in Figure 1.

Figure 5 is a vertical section taken substantially on the line 5—5 of Figure 1 and looking in the direction of the arrows.

Figure 6 is a bottom plan view of the stand with the protecting cover for the controlling apparatus removed, showing the switching mechanism.

Figure 7 is an enlarged elevational view of the switch.

Figure 8 is a plan view of the snap action switch spring; and

Figure 9 is a schematic diagram.

Referring now to the drawing, reference characters 10, 11 and 12 represent the body, shell and handle portions respectively of an electric iron which in these parts may be of the conventional or any desired construction. The electric heating element 15 is clamped between the body and the ironing plate or shoe 17 by means of the studs 18 and nuts 19, which thus cooperate to secure together all of the parts thus far described. The heating element may also be of any suitable or usual construction, but is preferably of such size as to consume a kilowatt of current or more, for an iron of ordinary household proportions, such as the six pound size. I preferably design the heating element to consume approximately 1300 watts at the rated voltage.

Suitable connections to the heating element are made at terminals 20 arranged in an insulating back wall 22 mounted within the shell of the iron. Formed integrally with the terminals and projecting from the rear face of the back wall are contact elements 25, which comprise simple rods extending through enlarged openings as 26 in the shell and having downturned extremities at the back of the iron, shielded by a cover 27 open at the bottom and held in place thereover by the rearmost nut 19. The lower ends of contacts 25 project somewhat below the open bottom of box 27 and are adapted to engage suitable contacts as 30 carried in the contact box 36 mounted on the base or stand portion 35.

The stand may be pressed of sheet metal and provided with suitable feet as 32 which somewhat elevate it and the iron, and upwardly projecting ears 33 for locating the iron and guiding it into the proper position as it is placed upon the stand, but so inclined and spaced as not to take any of the weight of the iron, as best shown in Figure 3. The forepart of the stand is of appropriate shape and size to support the iron itself directly in front of the contact box 36, supported on the rear end of the stand and formed of sheet metal, enclosing an insulating block 37, vertically apertured as at 38 to receive the contacts 25 carried by the iron and supporting in a position elevated above the stand, as on spring arms 39, the contacts 30, which are thus engageable by the iron contacts 25. The arms 39 are relatively rigid; that is, do not flex materially under the weight of the iron, but absorb shock if the iron is allowed to strike the contacts too hard. Arms 39 are connected one to one of the wires of cord 40 and the other as by wire 41 to a terminal 42 of a thermostatic switch arranged to open the circuit to the wire 43 of cord 40 which is connected to the other switch terminal 44, and so control the supply of current to the iron contacts.

The switch consists of an insulating body 45 in a suitable opening as 47 of which a leaf spring contact arm 50 is arranged to reciprocate into and out of engagement with a contact point 51 connected to and shown as carried by terminal 42, the other end of contact spring 50 being shown as bent around and clamped under the metal block 52, which is held in place by contact screw 44. As best shown in Figure 7, block 52 is counterbored to provide a hollow portion directly beneath the spring 50, while the spring is embossed as at 53 to provide a stretched area which when the spring is relaxed tends to project from the side away from the block 52, and hold the contact at the outer end of the spring in engagement with fixed contact 51. The snap-boss portion may be pushed in the other direction, however, to project from the other side of the spring and into the cup provided for such purpose in the face of block 52, formed by counterboring the same, and the boss portion in passing over center imparts a snap action to the spring which quickly moves the spring-carried contact 51 from one extreme of its movement to the other. Preferably the portion 53 is somewhat elongated rather than round, and it and the spring shape and points of engagement of the contacts are so related that when breaking, the contacts remain in engagement until the snap-action boss passes over center, after which the spring contact moves quickly away to its full gap, which is greater than the extreme distance to which an arc can possibly be stretched, even if at the instant of break peak voltage should be flowing through the contacts. The boss 53 is preferably formed very shallow, and accordingly provides considerable multiplying action. In my preferred construction such multiplication is such that depressing the boss (by means of the operating plunger) through a distance of the order of .005 inch is sufficient to open a gap of approximately ⅛ inch between the contacts, although this is not at all critical. As indicated above, the contact switch spring is balanced to close under its own tension, and may be operated to move it to open position by a plunger 55 slidably projecting through one side of the body 45 and operable by a pin 57 slidably supported in a bracket 59 mounted on the bottom face of the stand. The pin is operable by a thermostatic element 60 formed of bi-metal, and arranged, as best shown in Figures 1, 4 and 6, to constitute the entire support for the front end of the iron. This element is shown as secured by means of screws 61 to the top of the standard, and curved to project through and both above and below the same, extending freely through a slot as 63 therein and coupled at its extremity beneath the standard by means of a link 65 to the operating pin 57 for the switch spring. The iron supporting portion of the thermostat may be backed up by a boss as 66 struck up therebeneath from the material of the stand. The thermostat is of such width as to provide a substantial line of contact with the iron, and may in addition be slightly flattened, as by slightly grinding its top surface, to provide surface rather than line contact.

The switch body is secured as by rivets to a swingable arm 70 comprising a strap of sheet metal pivoted transversely to the under side of the stand as upon pin 72, the arm at its point of connection to the pin being also slotted as at 74 to allow longitudinal travel to the extent necessarily caused by the swinging movement of the eccentric 75 which serves to swing the arm 70 and so the switch and plunger 55 toward and from the operating pin 57. The eccentric 75 is shown as trapped in a circular opening in the opposite end of the arm 70 from pivot pin 72, and operable by means of a handle 77 which projects from one side of the stand for convenient manipulation. The handle 77 and eccentric 75 are carried by a shaft 79 rotatably supported in a hanger 80, also mounted on the bottom of the stand and laterally slidable for initial adjustment by virtue of the provision of slots 81 engaging the screws 82 by which it may be fixed in place.

The thermostat is arranged to depress the plunger 55, upon heating sufficiently, and open the switch. Since as stated above the actual movement of the snap boss 53 necessary to throw the switch, may amount to but a few thousandths of an inch, the setting of the handle 77 may require the pin 57 to close an initial gap between itself and plunger 55 before being operable to open the switch, and the quickness with which such action will take place and therefore the temperature to which the iron must rise before it can be so cut out will be seen to be adjustable by movement of the switch with respect to the operating pin to vary such initial travel through which the pin must pass before it can engage the operating plunger.

Contacts 30 constitute the entire support for the rear of the iron, and the maintenance of full engagement between them and the iron contacts is assured by the three-point nature of the support, since the thermostat element 60 provides the only other support.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. Electric ironing apparatus including a stand, a pair of spaced supporting contacts carried by the stand, means for conducting an electric current to said contacts, additional supporting means carried by the stand arranged in non-linear relation with respect to said contacts and constituting therewith substantially the entire support for an iron, a bi-metallic thermostat element forming at least a part of said additional supporting means, an iron having an electric heating element therein and adapted to rest upon said contacts and additional supporting means and directly engageable with said thermostat element, said iron having contact portions for engagement with said supporting contacts to establish a circuit through said heating element, and a snap-action switch operable by said thermostat element and arranged in series with one of said contacts, said supporting contacts and additional supporting means holding the iron spaced above the stand.

2. Electric ironing apparatus including a stand, supporting and contact means carried by the stand, an iron having an electric heating element therein and adapted to rest upon said stand, said iron having contact portions for the heating element adapted to engage the contact means carried by the stand when the iron is rested thereupon, switching means arranged in series with one of said contact means, and thermally responsive motor means for operating said switching means, also mounted in the stand and directly engageable by the iron, said contact means and thermally responsive motor means holding the iron spaced above the stand.

3. In combination with a stand and an electrically heatable device adapted to be rested upon the stand during energization, and to be de-energized when removed from the stand, said heatable device having contacts adapted for detachable engagement with cooperating current supplying contacts carried by the stand, current controlling means carried by the stand and responsive to the temperature of the heatable device, comprising a warp-type thermostat carried by the stand but having only a relatively slight heat-conductive connection therewith, said thermostat element having at least a part on top of the stand in direct metallic heat-conductive communication with the heatable device and supporting a substantial part of the weight of said device when the latter is rested on the stand, another integral portion of the thermostat being spaced from both the stand and the heatable element, and heat conduction between it and the stand being restricted, such portion being free to warp under temperature changes of the heatable device, and a switch carried by the stand and connected to and actuable by said last mentioned portion of the thermostat for controlling the flow of current to said contacts.

4. In combination with a stand and an electrically heatable device adapted to be rested upon the stand during energization, and to be deenergized when removed from said stand, said heatable device having contacts adapted for detachable engagement with cooperating current supplying contacts carried by the stand, current controlling means carried by the stand and responsive to the temperature of the heatable device, comprising a warp-type thermostat carried by the stand but having only a relatively slight area in heat conductive engagement therewith, said portion of the thermostat being exposed on top of the stand and in direct metallic heat-conductive communication with the heatable device when the latter is rested upon the stand, said thermostat having a part free to warp extending through and below the stand, and a switch carried by and beneath the stand and connected to said portion of the thermostat and actuable thereby to control the flow of current to said contacts.

5. In combination with a stand and an electrically heatable device adapted to be rested upon the stand during energization and having contacts adapted for detachable engagement with cooperating current supplying contacts carried by the stand, current controlling means carried by the stand and responsive to the temperature of the heatable device, comprising a warp-type thermostat element of relatively small cross section carried by the stand and having only a relatively slight area in heat-conductive engagement with the stand, said thermostat element having a part on top of the stand and in direct metallic heat-conductive communication with the heatable device, a switch carried by the stand and actuable by the thermostat for controlling the flow of current to said contacts, direct heat conduction between the heatable device and the stand being greatly restricted.

6. In combination with a stand and an electrically heatable device adapted to be rested upon the stand during energization and having contacts adapted for detachable engagement with cooperating current supplying contacts carried by the stand, current controlling means carried by the stand and responsive to the temperature of the heatable device, comprising a warp-type thermostat element of relatively small cross section carried by the stand and having only a relatively slight area in heat-conductive engagement with the stand, said thermostat element having a part on top of the stand in direct metallic heat-conductive communication with the heatable device, a switch carried by the stand and actuable by the thermostat for controlling the flow of current to said contacts, said first mentioned part of the thermostat being so interposed between said device and the stand that heat from said device must pass through the thermostat before reaching the stand.

7. In combination with a stand and an electrically heatable device adapted to be rested upon the stand during energization and having contacts adapted for detachable engagement with cooperating current supplying contacts carried by the stand, current controlling means carried by the stand and responsive to the temperature of the heatable device, comprising a warp-type thermostat element of relatively small cross section carried by the stand and having only a relatively slight area in heat-conductive engagement with the stand, said thermostat element having a part on top of the stand in direct heat-conductive communication with the heatable device, a switch carried by the stand and actuable by the thermostat for controlling the flow of current to said contacts, said first mentioned part of the thermostat projecting above the stand to support the heatable device thereabove, whereby heat from said device must pass the thermostat to reach the stand.

8. In combination with a stand and an electrically heatable device adapted to be rested upon the stand during energization and having contacts adapted for detachable engagement with cooperating current supplying contacts carried by the stand, current controlling means carried by the stand and responsive to the temperature of the heatable device, comprising a warp-type thermostat element of relatively small cross section carried by the stand and having only a relatively slight area in heat-conductive engagement with the stand, said thermostat element having a part on top of the stand in direct metallic heat-conductive communication with the heating device, a switch carried by the stand and actuable by the thermostat for controlling the flow of current to said contacts, said first mentioned part of the thermostat projecting above the stand to support the heatable device thereabove, whereby heat from said device must pass the thermostat to reach the stand, said portion of the thermostat constituting a large proportion of the active supporting surface with which the heatable device engages.

9. In combination with a stand and an electrically heatable device adapted to be rested upon the stand during energization and having contacts adapted for detachable engagement with cooperating current supplying contacts carried by the stand, current controlling means carried by the stand and responsive to the temperature of the heatable device, comprising a warp-type thermostat element carried by the stand, said thermostat element having a part in direct metallic heat-conductive communication with the heatable device, a switch actuable by the thermostat for controlling the flow of current to said contacts, said part of the thermostat being so interposed between said device and the stand that heat from said device must pass through the thermostat before reaching the stand.

10. In combination with a stand and an electrically heatable device adapted to be rested upon the stand during energization and having contacts adapted for detachable engagement with cooperating current supplying contacts carried by the stand, current controlling means carried by the stand and responsive to the temperature of the heatable device, comprising a warp-type thermostat element carried by the stand, said thermostat element having a part in direct metallic-conductive communication with the heatable device, a switch actuable by the thermostat for controlling the flow of current to said contacts, said part of the thermostat forming at least a part of the supporting means for said device and being so interposed between said device and the stand that heat from said device must pass through the thermostat before reaching the stand.

11. In combination with a stand and an electrically heatable device adapted to be rested upon the stand during energization and having contacts adapted for detachable engagement with the cooperating current supplying contacts carried by the stand, current controlling means carried by the stand and responsive to the temperature of the heatable device, comprising a warp-type thermostat element carried by the stand, said thermostat element having a part in direct metallic heat-conductive communication with the heatable device, a switch actuable by the thermostat for controlling the flow of current to said contacts, said part of the thermostat forming at least a part of the supporting means for said device and holding the same spaced above the body of the stand in such manner that heat from said device must pass through the thermostat before reaching the stand.

12. Means as set forth in claim 3 in which said first mentioned contacts and said part of the thermostat carry substantially the entire weight of said heatable device when the latter is rested on the stand.

RALPH H. BEACH.